Nov. 2, 1937.    R. C. GALLINANT    2,097,761
HEDGE TRIMMER
Filed May 6, 1936     2 Sheets-Sheet 1
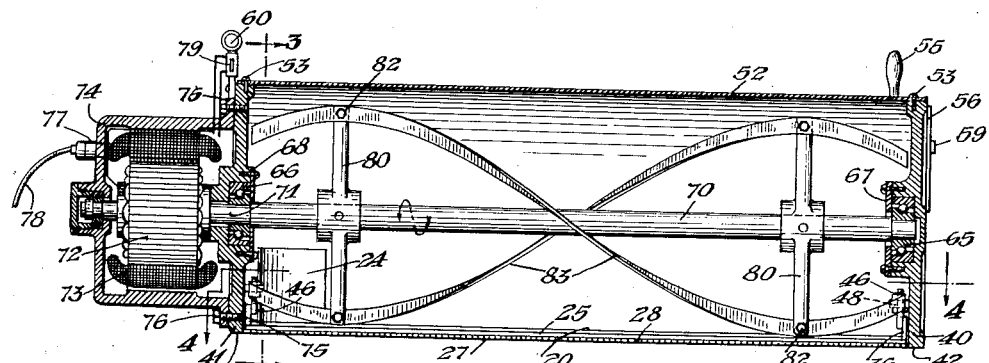
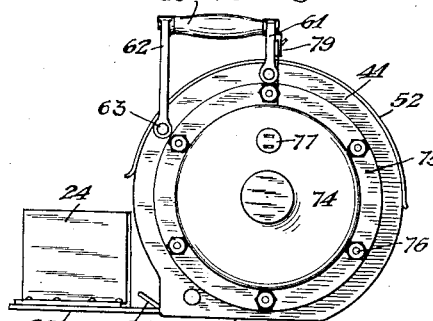
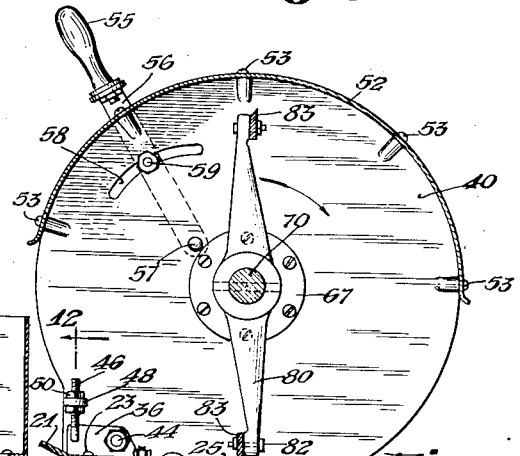
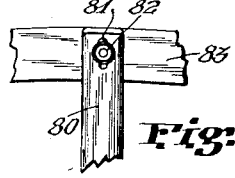
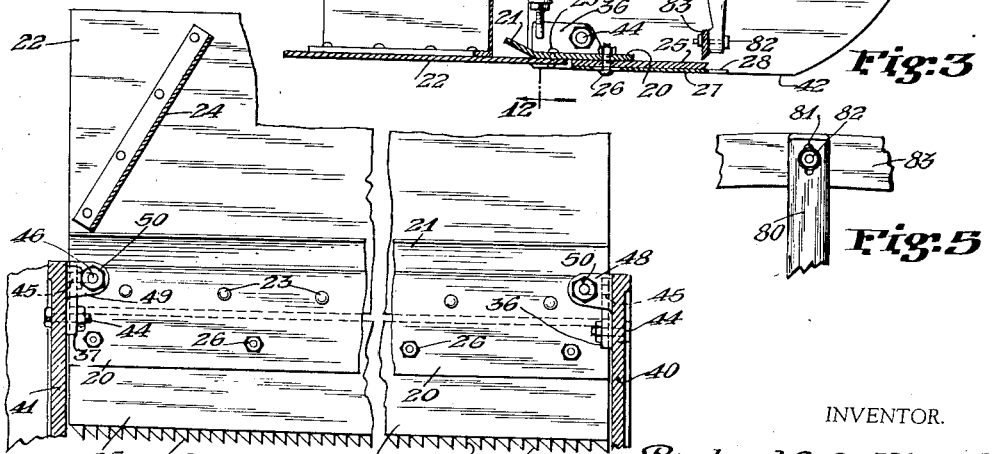
INVENTOR.
Raphael C. Gallinant
BY
Warren E. Willis.
ATTORNEY.

Nov. 2, 1937.  R. C. GALLINANT  2,097,761
HEDGE TRIMMER
Filed May 6, 1936   2 Sheets-Sheet 2
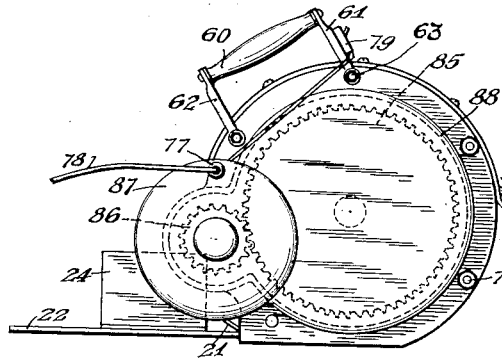
Fig. 6
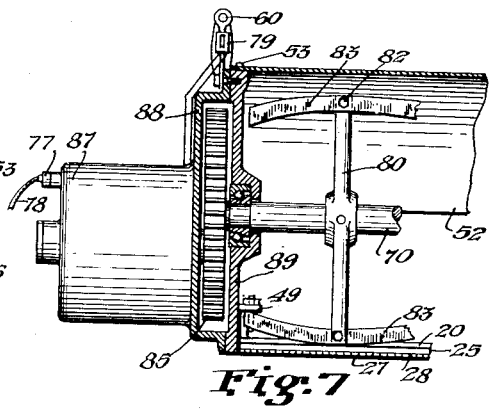
Fig. 7
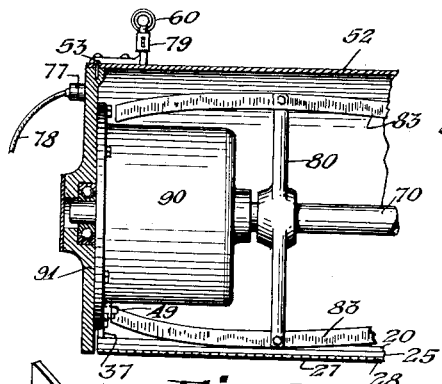
Fig. 8
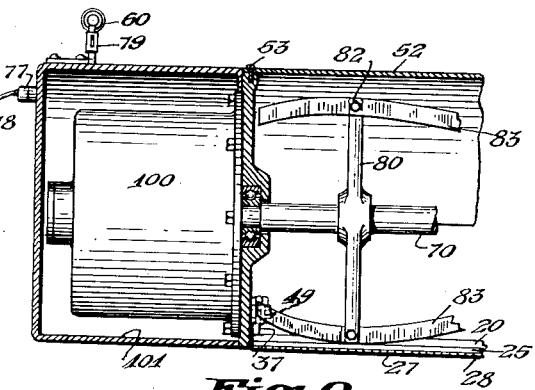
Fig. 9
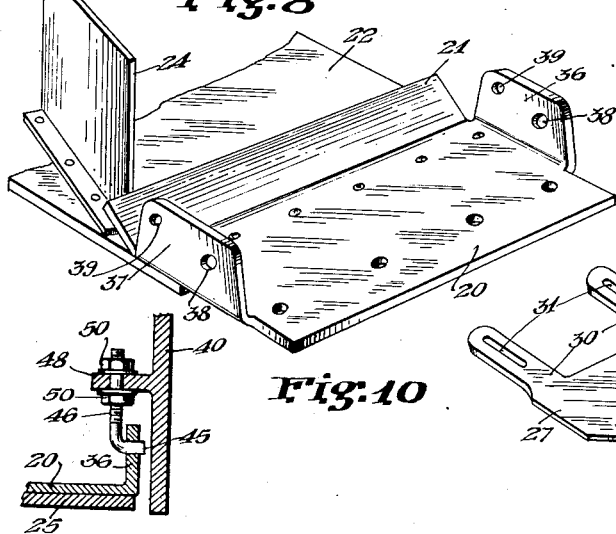
Fig. 10
Fig. 12
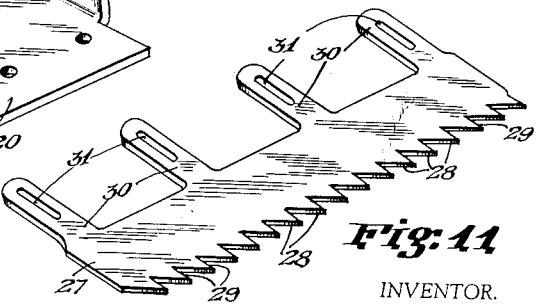
Fig. 11
INVENTOR.
Raphael C. Gallinant
BY Warren E. Willis.
ATTORNEY.

Patented Nov. 2, 1937

2,097,761

UNITED STATES PATENT OFFICE 2,097,761

HEDGE TRIMMER

Raphael C. Gallinant, Ridgefield Park, N. J., assignor of one-half to John C. Chello, Ridgefield Park, N. J.

Application May 6, 1936, Serial No. 78,100

12 Claims. (Cl. 30—240)

This invention relates to apparatus for reducing the excess growth of foliage on hedges and the like, commonly known as hedge trimmers.

An object of the invention is to provide a power driven apparatus in which a series of revolving helical cutter blades act conjunctively with a straight fixed blade in shearing the tender new shoots to a desirable level.

A further feature is in the provision of means for maintaining the foliage in a substantially erect position during the cutting operation, so that the trimming is easily and positively accomplished.

Another purpose is to produce means for individually adjusting each of the rotary blades, and also the cutter bar, as may be required.

Still another aim is to so design the apparatus as to enable it to operate closely against an abutment or corner.

These and other objects, such as lightness in weight, convenience in handling, power control, etc., are accomplished by the novel and practical construction, combination and arrangement of parts hereinafter described and illustrated in the accompanying drawings, constituting an important component of this disclosure, and in which:

Figure 1 is a longitudinal sectional view of the preferred embodiment of the invention.

Figure 2 is an elevational view thereof looking from the motor end.

Figure 3 is an enlarged transverse sectional view taken on line 3—3 of Figure 1.

Figure 4 is a longitudinal sectional view taken on line 4—4 of Figure 1.

Figure 5 is a fragmentary plan view showing the adjustable connection of the rotary blades.

Figure 6 is an end elevational view, similar to Figure 2, but showing a motor driven, speed reduced type of trimmer.

Figure 7 is a fragmentary longitudinal sectional view of the same.

Figure 8 is a similar sectional view of a modification in direct motor driven attachment.

Figure 9 is another like view of a further modification in motor drive.

Figure 10 is a perspective view of the bed plate connecting the ends and carrying the cutter bar.

Figure 11 is a perspective view of the toothed guide for holding the foliage erect during the shearing contact of the rotating blades and cutter bar.

Figure 12 is an enlarged fragmentary sectional view, taken on line 12—12 of Figure 3, showing the cutter bar adjusting means.

Referring in greater detail to the drawings, the foundation of the apparatus may be considered to be a bed plate 20 rectangular in profile and having an angularly disposed rear stiffening extension 21 reaching from end to end.

A level flat support or glider plate 22 is secured by rivets 23 to the underside of the bed plate adapted to ride over the cut surface, carrying much of the weight of the apparatus and materially aiding in maintaining a level trim.

Mounted on the glider plate is an angularly disposed guard 24 adapted to divert the cuttings from the path of the operator, a receptacle (not shown) may be arranged to receive the cuttings.

Attached to the forward portion of the bed plate is a cutter bar 25 secured by bolts 26 and having a bevelled cutting edge, below which is a guide plate 27 provided with teeth, one of their edges 29 being at right angles to the plate and the other edge 28 opposed to the action of the revolving knives at an acute angle to the plate.

Reaching rearwardly from the guide plate 27 are integral arms 30 containing slots 31 engaged by the clamp bolts 26, thus adjustably binding the guide plate and fixed cutter to the bed plate.

At the ends of the bed plate 20 are upstanding lugs 36—37 provided with openings 38 and 39 respectively. The lug 36 is disposed at the inner side of a head or end frame member 40 while the lug 37 is similarly located against the other end frame member 41.

Both these heads are substantially circular, flattened at their lower edges 42—43, level with the under side of the guide plate 27 and extended slightly to the rear to present right angled corners against which the lugs 36—37 make contact.

These lugs are pivotally mounted on clamp bolts 44 passing through appropriate openings in the heads and the openings 38 in the lugs.

The bed plate, and thus the cutter bar 25 and guide 27, are adjusted on the pivots 44 by the right angled ends 45 of bolts 46 being passed through the lug openings 39, while the threaded stems of the bolts pass through in reaching flattened bosses 48—49 on the respective end members, the bolts being provided with adjusting nuts 50, the arrangement being best shown in Figure 12.

The heads 40—41 are connected by a semicircular shield 52 disposed over their upper portions and held rigidly by screws 53 set in their periphery.

A handle 55 having an offset shank 56 is pivoted at 57 to the head 40, this head having an arcuate slot 58 to receive a bolt 59 by which the position of the handle may be adjusted and clamped.

Another handle 60 disposed transversely to the apparatus, is attached rigidly to the head 41 by arms 61—62 held by bolts 63.

Set in the inner sides of central hubbed portions of the heads 40—41 are anti-friction bearings 65—66 held by removable dirt proof plates 67—68 and revolubly mounted in these bearings is a shaft 70.

The head 40 has no through opening at the end of its bearing while the head 41 is bored to receive the reduced end 71 of the shaft which extends through an armature 72 of an electric motor, the fields 73 of which are held in a casing 74, its flange 75 being secured by bolts 76 to the head 41.

The motor casing 74 is provided with a socket 77 to receive a cable 78 leading to a source of electric energy and the motor is controlled by a switch 79 arranged adjacent the handle 60.

Mounted on the shaft 70 are spiders 80 having two or more arms, preferably slotted as at 81 (see Figure 5) and carrying bolts 82 by which are adjustably attached helical blades 83 to act cooperatively with the cutter bar 25.

In Figures 6 and 7 the construction of the trimmer body corresponds to the previous description, but the shaft 70 carries at its driven end a spur gear 85 meshed with a pinion 86 directly connected with an electric motor housed in a casing 87 having an expanded base 88 bolted to the head 89.

The arrangement of the carrying handle and electric attachments are shown somewhat differently for the sake of convenience but remain essentially the same in effect.

As shown in Figure 8 the motor is disposed within a casing 90 bolted to the inner side of a head 91 around which the blades 83 rotate, the construction being compact, occupying less space than when the motor extends outwardly from the head.

Figure 9 discloses a device in which the blade carrying shaft 70 is direct driven by an electric motor contained within a housing 100 over which is a circular casing 101, of a diameter corresponding to that of the guard shell 52, the arrangement being such as to exclude all debris and dust from the motor and shaft bearings.

In operation, the handle 55 being adjusted to suit the convenience of the operator, both handles are grasped, the operator standing at the rear and slightly to the left. The motor is started, causing the blades to revolve and a cut made; thereafter the glider 22 carries the load on top of the trimmed surface.

It has been found by experience that the trimmer will advance without effort on part of the operator cutting a level or curved path as may be desired and, as the apparatus is quite light, no physical difficulty is encountered in maneuvering it.

At a corner or abutment, by reason of its structure, the machine will trim close and due to the adjustability of the blades, remain in good cutting condition indefinitely.

From the foregoing it will be seen that a simple device for this purpose has been disclosed in the preferred form of its embodiment, but it is not desired to restrict the details to the exact construction shown, it being obvious that changes may be made without departing from the scope of the appended claims.

Having thus described the invention, what is claimed as new and desired to secure by Letters Patent, is:—

1. In a hedge trimmer having rotary helical knives and a stationary cutter bar cooperative therewith, a plate below and in advance of said cutter bar, said plate having projections on its front edge presenting a multiplicity of angular serrations opposed to the angle of the helix of said helical blades on one side and at right angles with said cutter bar on the other side.

2. In a hedge trimmer having rotary helical knives and a stationary cutter bar cooperative therewith, a plate below and in advance of said cutter bar, said plate having projections on its front edge presenting a multiplicity of angular serrations opposed to the angle of the helix of said helical blades on one side and at right angles with said cutter bar on the other side, and means for adjusting said plate relative to the cutter bar.

3. In a hedge trimmer having rotary helical knives and a stationary cutter bar cooperative therewith, a pair of frame heads having an axial shaft on which said knives are mounted, a rigid semi-circular cover plate connecting said heads to guard said knives, a bed plate pivoted at its ends to said heads and extending rearwardly therebeyond, and means on said bed plate adapted to retain foliage erect at the instant of cutting.

4. In a hedge trimmer having rotary helical knives and a stationary cutter bar cooperative therewith, a pair of frame heads having an axial shaft on which said knives are mounted, a rigid convex cover plate connecting said heads over said knives, a bed plate pivoted at its ends to said heads rearward of their axes, means to adjust said bed plate on its pivots, and a glider on said bed plate adapted to sustain the weight of the trimmer.

5. In a hedge trimmer having rotary helical knives and a stationary cutter bar cooperative therewith, a pair of frame heads having an axial shaft on which said knives are mounted, a rigid cover plate connecting said heads and extending as a guard over said knives, an electric motor carried by one of said heads adapted to drive said shaft, and handles for maneuvering the trimmer at the opposite ends thereof.

6. In a power driven hedge trimmer having rotary knives and a fixed cutter bar cooperative therewith, means for adjusting each of said knives, means for adjusting said cutter bar, a glider rearward of the cutter bar, a deflector on said glider, and a serrated foliage support means below and in advance of said cutter bar, said foliage support having angular teeth one edge of which is at right angle with the axis of revolution of said rotary knives and the other edge at an acute angle therewith.

7. A hedge trimmer comprising a pair of spaced heads, a plate rigidly connecting said heads, a motor carried by one of said heads and having a shaft extending axially to the other head, spider arms fixed on said shaft carrying helical blades, means for adjusting said blades on said arms, a bed plate carrying a cutter bar to operate conjunctively with said helical blades, means for adjusting said cutter bar relative to the path of said helical blades, and a glider fixed to extend rearwardly of said bed plate.

8. In a power driven hedge trimmer having rotatable helical knives and a fixed cutter bar cooperative therewith, a guard plate covering said helical knives, a fixed handle at one end of the trimmer, an inset handle adjustable on the opposite end, a bed plate pivotally engaged at the trimmer ends, means for adjusting said plate, a glider plate fixed to extend rearwardly from said bed plate, and a serrated plate independently adjustable below and in front of said cutter bar, said serrated plate having projecting annular teeth adapted to retain the foliage erect.

9. A hedge trimmer comprising a pair of opposed substantially circular heads having antifriction bearings, an arcuate guard plate secured to the upper peripheral surface of said heads to extend therebetween, an electric motor mounted on one of said heads, said motor having a shaft journalled in said bearings, spider carried helical blades on said shaft, a bed plate rockingly mounted between said heads, a fixed cutter bar adjustable on said plate to cooperate with the rotary blades, handles attached to said heads, one of said handles being adjustable, and means carried in advance of said cutter bar adapted to retain the foliage erect during the cutting action of the blades.

10. In a power driven hedge trimmer having helical knives and a pivoted cutter bar to cooperate therewith, opposed frame heads having an axial shaft on which said knives are mounted, a guard plate partially enclosing said knives and connecting between said heads, an electric motor mounted on one of said heads offset from the axis of said shaft, and drive connections intervening said motor and shaft.

11. In a power driven hedge trimmer having helical knives and an adjustable cutter bar to cooperate therewith, spaced frame heads having an axial shaft on which said knives are carried, a curved guard plate partially enclosing said knives, an electric motor fixed on one of said heads in offset relation to the axis of said shaft, and a gear train to drive said shaft actuated by said motor.

12. In a power driven hedge trimmer having helical knives and an adjustable cutter bar to cooperate therewith, spaced frame heads having an axial shaft on which said knives are carried, a semi-circular guard plate partially enclosing said knives and connecting between the heads of said trimmer, an electric motor mounted on the inner side of one of said heads to drive said shaft, said motor extending interjacent the path of revolution of said knives under said guard plates.

RAPHAEL C. GALLINANT.